(12) United States Patent
Mori (10) Patent No.: US 9,899,790 B2
(45) Date of Patent: Feb. 20, 2018

(54) LASER APPARATUS HAVING TEMPERATURE CONTROL FUNCTION FOR MAINTENANCE WORK

(71) Applicant: FANUC CORPORATION, Minamitsuru-gun, Yamanashi (JP)

(72) Inventor: Atsushi Mori, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/240,002

(22) Filed: Aug. 18, 2016

(65) Prior Publication Data

US 2017/0063017 A1 Mar. 2, 2017

(30) Foreign Application Priority Data

Aug. 24, 2015 (JP) .................. 2015-164778

(51) Int. Cl.
*H01S 3/04* (2006.01)
*H01S 3/102* (2006.01)

(52) U.S. Cl.
CPC .......... *H01S 3/0407* (2013.01); *H01S 3/1028* (2013.01); *H01S 3/0401* (2013.01)

(58) Field of Classification Search
CPC .................. H01S 3/0407; H01S 3/1028
See application file for complete search history.

(56) References Cited

U.S. PATENT DOCUMENTS

| 9,585,570 B2* | 3/2017 | Suzuki | A61B 5/0095 |
| 2014/0290613 A1* | 10/2014 | Gruber | F01P 1/06 |
| | | | 123/143 B |

FOREIGN PATENT DOCUMENTS

| JP | A S57-045988 | 3/1982 |
| JP | A H01-232779 | 9/1989 |
| JP | 0273680 A | 3/1990 |
| JP | 04197593 A | 7/1992 |
| JP | A H04-335585 | 11/1992 |
| JP | A H04-356981 | 12/1992 |
| JP | 08204261 A | 8/1996 |
| JP | 2002057385 A | 2/2002 |
| JP | A 2003-110174 | 4/2003 |
| JP | A 2012-024778 | 2/2012 |
| JP | A 2013-239696 | 11/2013 |

* cited by examiner

*Primary Examiner* — Dung Nguyen
(74) *Attorney, Agent, or Firm* — RatnerPrestia (57) ABSTRACT

A laser apparatus able to prevent the formation of condensation at the time of maintenance work. The laser apparatus includes a housing having an openable sealed structure, an optical system set inside the housing, a temperature regulation mechanism maintaining the optical system at a predetermined temperature, and a preparatory step controller controlling a preparatory step performed before opening the housing. The temperature regulation mechanism is configured to maintain the optical system at a first temperature during operation of the laser apparatus and to maintain the optical system at a second temperature of the first temperature or more when the preparatory step is started.

6 Claims, 10 Drawing Sheets

LASER APPARATUS HAVING TEMPERATURE CONTROL FUNCTION FOR MAINTENANCE WORK

BACKGROUND OF THE INVENTION

1. Field of the Invention

The present invention relates to a laser apparatus.

2. Description of the Related Art

Some component parts used in laser apparatuses become shorter in lifetime if used at a high temperature. Conversely, if the temperature becomes too low, the characteristics of the laser are able to change. For this reason, in general, the temperature is controlled so that the component parts are maintained at a predetermined temperature of 15° C. to 30° C. in range.

When a laser apparatus is used in a high temperature, high humidity environment, due to the temperature difference between the outside air and the component parts which are maintained at a low temperature, condensation sometimes forms. In particular, if condensation forms at an optical part, it causes the laser light to be absorbed or scattered and the desired performance can no longer be realized. Further, if dust or volatile matter or other foreign matter adheres to a location where condensation forms, after drying, the foreign matter will stick on the surface of the optical part and therefore the optical part will have to be replaced or repaired. Condensation also increases the risk of electric shock or short-circuiting, so is not desirable for electrical parts.

Known in the art are various techniques for preventing the formation of condensation at optical parts. Known in the art is a laser oscillator including a dehumidifier supplying dry air to the inside of the housing holding optical parts etc. (see Japanese Patent Publication No. 04-356981A, Japanese Patent Publication No. 2012-024778A, and Japanese Patent Publication No. 2013-239696A). Known in the art is also a laser oscillator designed to adjust the temperature of optical parts by heating the cooling water for cooling optical components in accordance with need (see Japanese Patent Publication No. 01-232779A, Japanese Patent Publication No. 57-045988A, and Japanese Patent Publication No. 04-335585A).

Also known in the art is a laser oscillator designed to stop the supply of coolant cooling an optical part at the time of stopping emission so as to prevent the formation of condensation (see Japanese Patent Publication No. 2003-110174A).

SUMMARY OF INVENTION

In the past, if opening the door of a housing holding optical parts etc. during maintenance work, condensation was liable to form, so it was necessary to wait for a long time until the temperature inside the housing sufficiently rose. Therefore, a laser apparatus designed to enable maintenance work to be quickly performed in accordance with need has been sought.

According to a preferable embodiment, there is provided a laser apparatus including a housing having an openable sealed structure, an optical system set inside the housing, a temperature regulation mechanism maintaining the optical system at a predetermined temperature, and a preparatory step controller controlling a preparatory step performed before opening the housing, the temperature regulation mechanism being configured to maintain the optical system at a first temperature during operation of the laser apparatus and to maintain the optical system at a second temperature of the first temperature or more when the preparatory step is started.

According to a preferable embodiment, the laser apparatus further includes a first temperature acquiring part acquiring an outside air temperature and a temperature calculating part using the outside air temperature as the basis to calculate the second temperature.

According to a preferable embodiment, the temperature calculating part is configured to calculate the second temperature so that the second temperature becomes the outside air temperature or more.

According to a preferable embodiment, the laser apparatus further includes a dew point temperature acquiring part acquiring a dew point temperature of the outside air and a temperature calculating part using the dew point temperature as the basis to calculate the second temperature.

According to a preferable embodiment, the laser apparatus further includes a signal output part outputting a signal when a temperature of the optical system reaches the second temperature.

According to a preferable embodiment, there is further provided a laser apparatus including a housing having an openable sealed structure, an optical system set inside the housing, a temperature regulation mechanism maintaining the optical system at a predetermined temperature, a preparatory step controller controlling a preparatory step performed before opening the housing, and an air feeding part feeding dry air to the inside of the housing when the preparatory step is started.

BRIEF DESCRIPTION OF DRAWINGS

These and other objects, features, and advantages of the present invention will become clearer by referring to the detailed description of illustrative embodiments of the present invention shown in the attached drawings.

DETAILED DESCRIPTION

Below, embodiments of the present invention will be explained with reference to the attached drawings. The component elements in the illustrated embodiments are suitably changed in scale for assisting understanding of the present invention. Further, the same or corresponding component elements use the same reference notations.

Figure 1A:
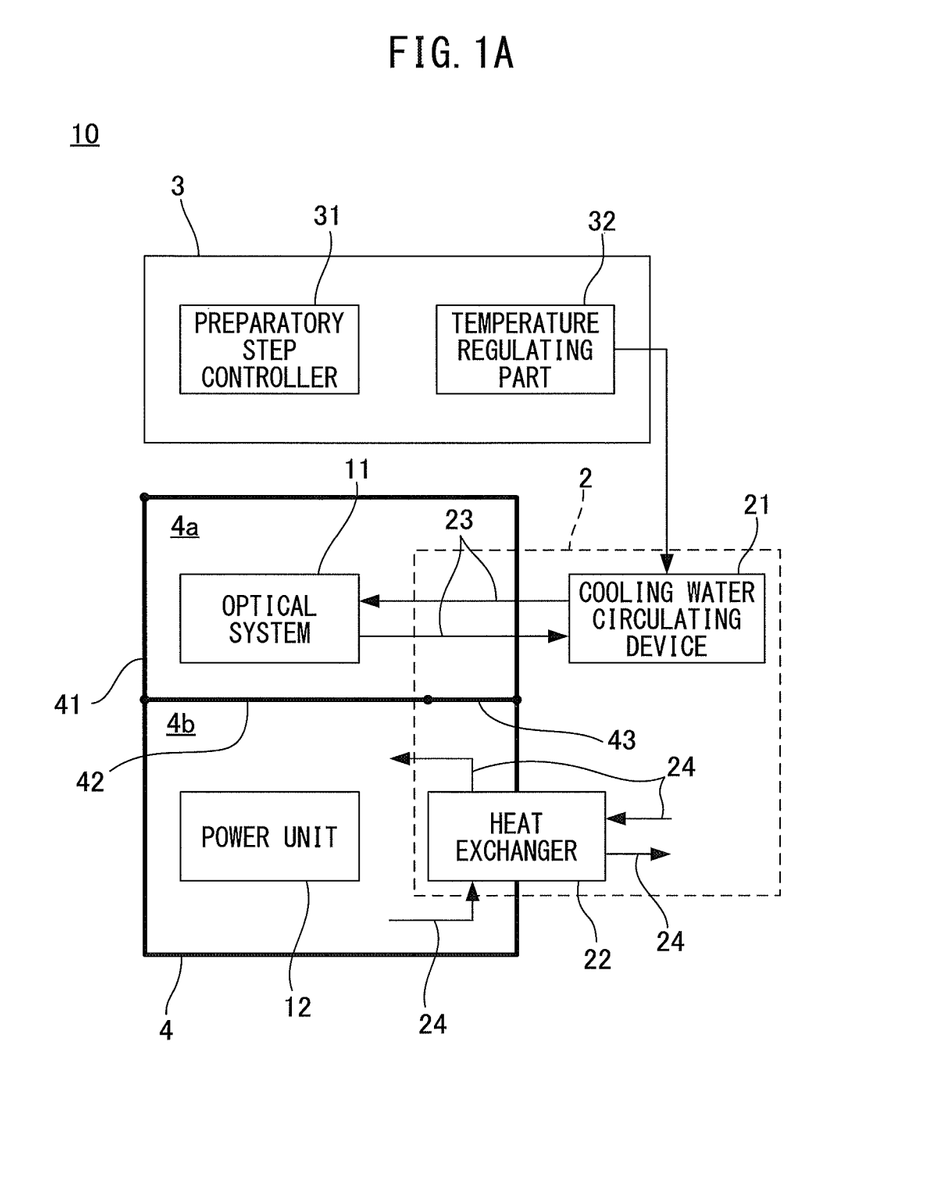
FIG. 1A is a view showing an example of the configuration of a laser apparatus according to a first embodiment.
Figure 1B:
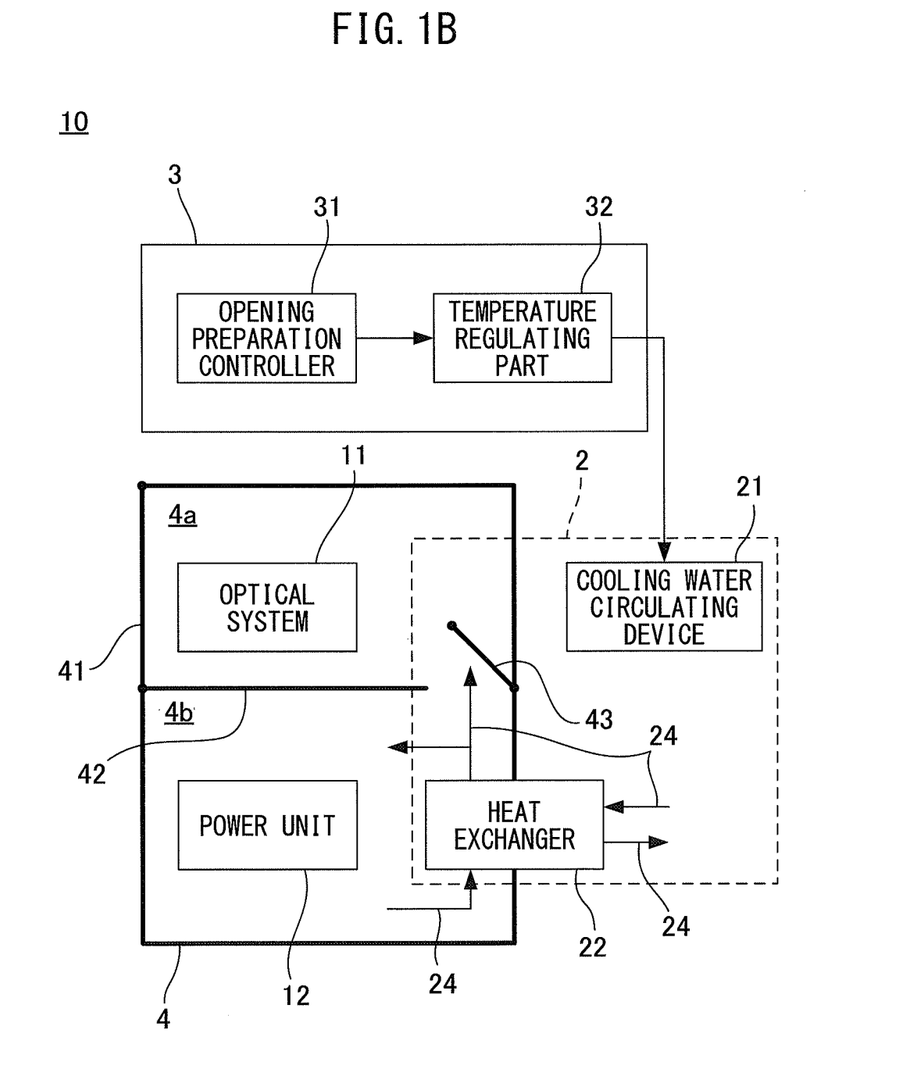
FIG. 1B is a view showing the state when switching to a service mode in the laser apparatus of FIG. 1A.
Figure 1C:
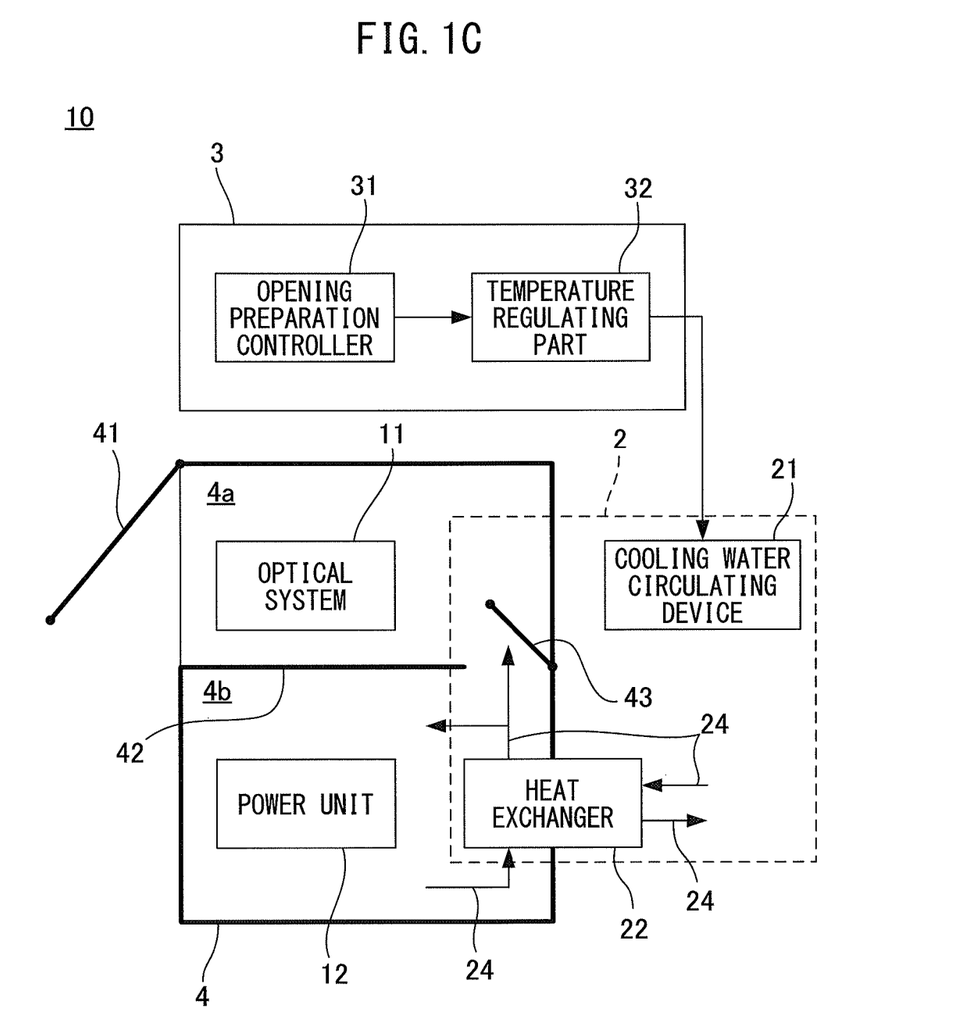
FIG. 1C is a view showing the state when performing maintenance work in the laser apparatus of FIG. 1A.

FIG. 1A, FIG. 1B, and FIG. 1C show an example of the configuration of a laser apparatus 10 according to a first embodiment. The laser apparatus 10 utilizes a laser beam emitted from a laser oscillator for use for processing a workpiece, for example, welding it, drilling a hole in it, or cutting it. The laser apparatus 10 includes an optical system 11, a power unit 12, a temperature regulation mechanism 2, and a controller 3 controlling the temperature regulation mechanism 2.

The optical system 11 includes various optical parts used in the laser apparatus 10. The optical parts include a reflection mirror forming an optical resonator.

The power unit 12 supplies electric power for exciting a laser medium to the laser oscillator. The laser medium may be carbon dioxide gas or another gas or may be glass, a crystal, semiconductor, or other solid.

The optical system 11 and the power unit 12 are held in a housing 4 having a generally sealed structure. The housing 4 includes an openable door 41 and is designed to enable access to the component parts inside of the housing 4 according to need. The laser apparatus 10 may further include additional optical parts for bending or reflecting the emitted laser beam at the outside of the housing 4.

The housing 4 forms a first space 4a and second space 4b separated from each other by a partition 42 and valve 43 (see FIG. 1A). The optical system 11 is held in the first space 4a while the power unit 12 is held in the second space 4b. The valve 43 is an electromagnetic valve controlled to be opened and closed by the controller 3. When the valve 43 is opened (see FIG. 1B), the first space 4a and the second space 4b are communicated with each other.

In one embodiment, to prevent the humidity at the inside space of the housing 4 from rising, a dehumidifying agent may also be used. Alternatively, if the surrounding atmosphere is particularly high in temperature and humidity (for example, air temperature about 40° C. and dew point temperature 30° C.), a dehumidifier or device feeding dry air may also be used.

The temperature regulation mechanism 2 adjusts the temperature of the inside space of the housing 4. The temperature regulation mechanism 2 includes a cooling water recirculation system 21 and a heat exchanger 22.

The cooling water recirculation system 21 supplies cooling water for cooling the optical system 11 through piping. The cooling water warmed by heat exchange with the optical system 11 is recirculated to the cooling water recirculation system 21 and again cooled by a cooling device. The arrows 23 shown in FIG. 1A show the flow of the cooling water.

The heat exchanger 22 is configured so as to maintain the power unit 12 at the outside air temperature through heat exchange between the second space 4b of the housing 4 and the outside air. The arrows 24 of FIG. 1A show the direction of transmission of heat. In one embodiment, the heat exchanger 22 may be an inside/outside air separation type heat exchanger. The heat exchanger 22 uses a thin metal sheet to separate the inside space and outside space of the housing 4 from each other. Due to this, the outside air is prevented from entering the inside of the housing 4.

The controller 3 is used to start up or stop the laser apparatus 10, control the laser output, or control the temperature of the component parts of the laser apparatus 10. The controller 3 is a digital computer provided with a CPU, memory, and interface connected to external devices. The CPU performs various processing relating to the operation of the laser apparatus 10. The memory includes a ROM, RAM, nonvolatile memory, etc.

The ROM stores a system program controlling the overall operation of the controller 3. The RAM stores the results of processing of the CPU, the input values, the detection values, etc. The nonvolatile memory stores a control program of the laser apparatus 10 and related parameters etc. The interface is used for connection to external devices such as an input device and display device.

The controller 3 includes a preparatory step controller 31 and a temperature regulating part 32. The preparatory step controller 31 controls a preparatory step before performing maintenance work (work accompanying maintenance, inspection, etc.). The preparatory step controller 31 starts the preparatory step corresponding to an operation of the operator. When maintenance work is periodically performed, the preparatory step controller 31 may be programmed so as to start a preparatory step at a predetermined time.

The temperature regulating part 32 controls the cooling water recirculation system 21 to maintain the temperature of the optical system 11 at a predetermined temperature.

Next, the operation of the laser apparatus 10 will be explained. The laser apparatus 10 is designed to switch between a normal mode for emitting a laser beam and a service mode for performing maintenance work.

(1) When Selecting Normal Mode

When the normal mode is selected, the door 41 of the housing 4 and the valve 43 are respectively at their closed positions. That is, the inside space of the housing 4 is separated into the first space 4a and the second space 4b (see FIG. 1A). The temperature regulating part 32 controls the cooling water recirculation system 21 to supply cooling water through the piping and maintain the optical system 11 at a substantially constant temperature. For example, the optical system 11 is maintained at a predetermined temperature in the range of 15° C. to 30° C., for example, about 20° C. The optical system 11 is maintained in a range of for example about ±1° C. from a predetermined temperature. On the other hand, the power unit 12 is maintained at about the same extent as the outside air temperature by the heat exchanger 22.

(2) When Selecting Service Mode

If the operator operates a switch connected to the controller 3 to select the service mode, in response to that, the controller 3 performs a preparatory step for performing maintenance work in accordance with a predetermined sequence program. The sequence program is read out from a nonvolatile memory of the controller 3.

The service mode is selected when it is necessary to open the door 41 of the housing 4 to access the inside. If opening the door 41 right after switching from the normal mode to the service mode, relatively high temperature, high humidity outside air enters the inside space of the housing 4 and condensation sometimes forms. In particular, if condensation forms at the surfaces of the lenses and other optical parts forming the optical system 11, the desired functions of the optical system 11 are liable to be impaired.

According to the present embodiment, when the service mode is selected, the preparatory step to be performed before opening the door 41 is performed. If the preparatory step controller 31 receives a signal indicating selection of the service mode, the preparatory step controller 31 controls the temperature regulating part 32 and valve 43 to perform the preparatory step.

In the preparatory step, the temperature regulating part 32 stops the supply of cooling water by the cooling water recirculation system 21 in response to a signal sent out from the preparatory step controller 31. Further, the preparatory step controller 31 opens the valve 43 and connects the first space 4a and the second space 4b with each other (see FIG. 1B). When opening the valve 43, the second space 4b becomes lower in humidity. The heat exchanger 22 continues to operate even after switching to the service mode, so the optical system 11 is warmed by the heat exchanger 22 without condensation until reaching about the outside air temperature.

According to the laser apparatus 10 according to the present embodiment, if the service mode is selected, the above-mentioned preparatory step is automatically started. In the preparatory step, the heat exchanger 22 causes the temperature of the optical system 11 to rise until a temperature of about the same extent as the outside air. Therefore, if opening the door 41 after the elapse of a predetermined time after selection of the service mode (see FIG. 1C), maintenance work can be performed without condensation being formed in the optical system 11.

In the modification of the first embodiment, the laser apparatus 10 need not include the partition 42 and valve 43. In this case, in the normal mode as well, the first space 4a and the second space 4b are communicated with each other. The operation when the service mode is selected is similar to the first embodiment.

Figure 2A:
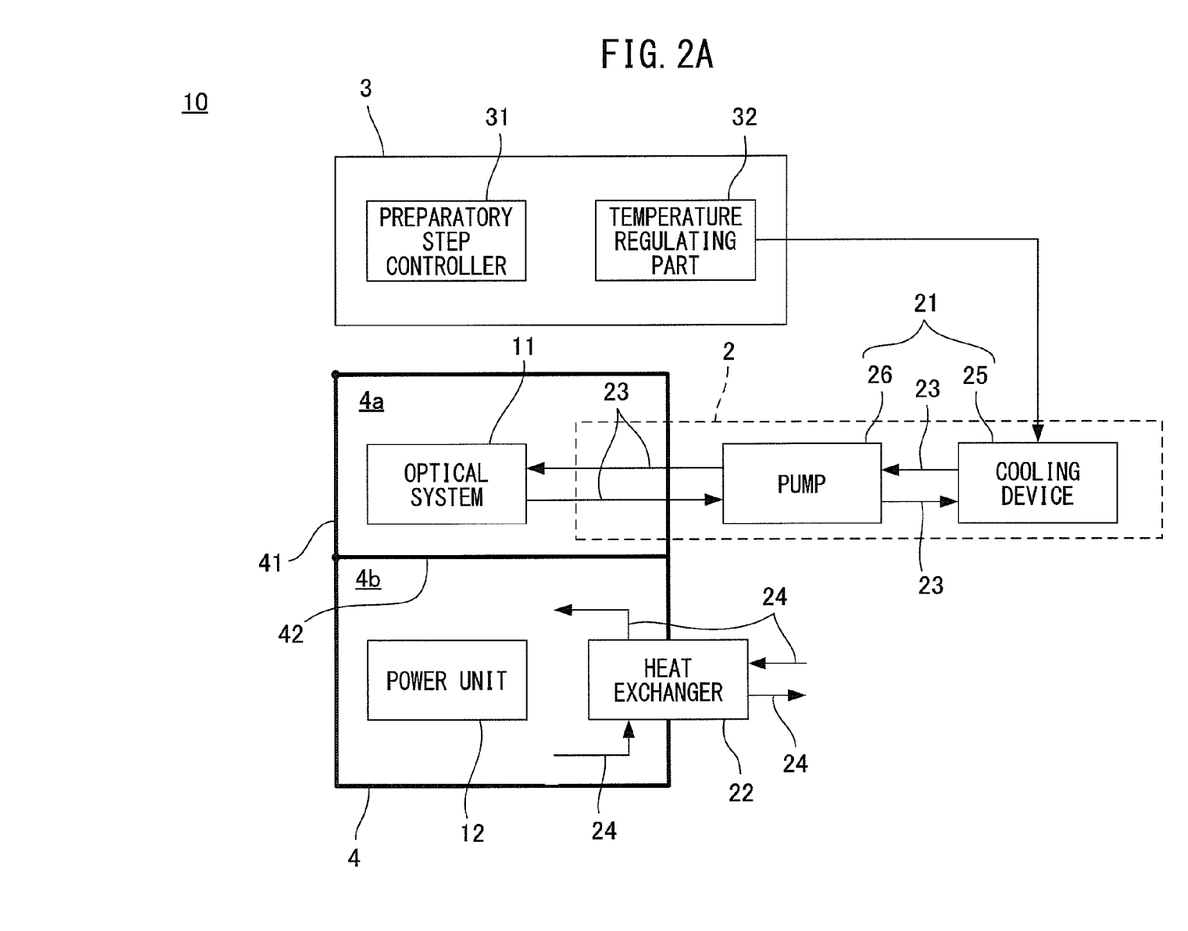
FIG. 2A is a view showing an example of the configuration of a laser apparatus according to a second embodiment.
Figure 2B:
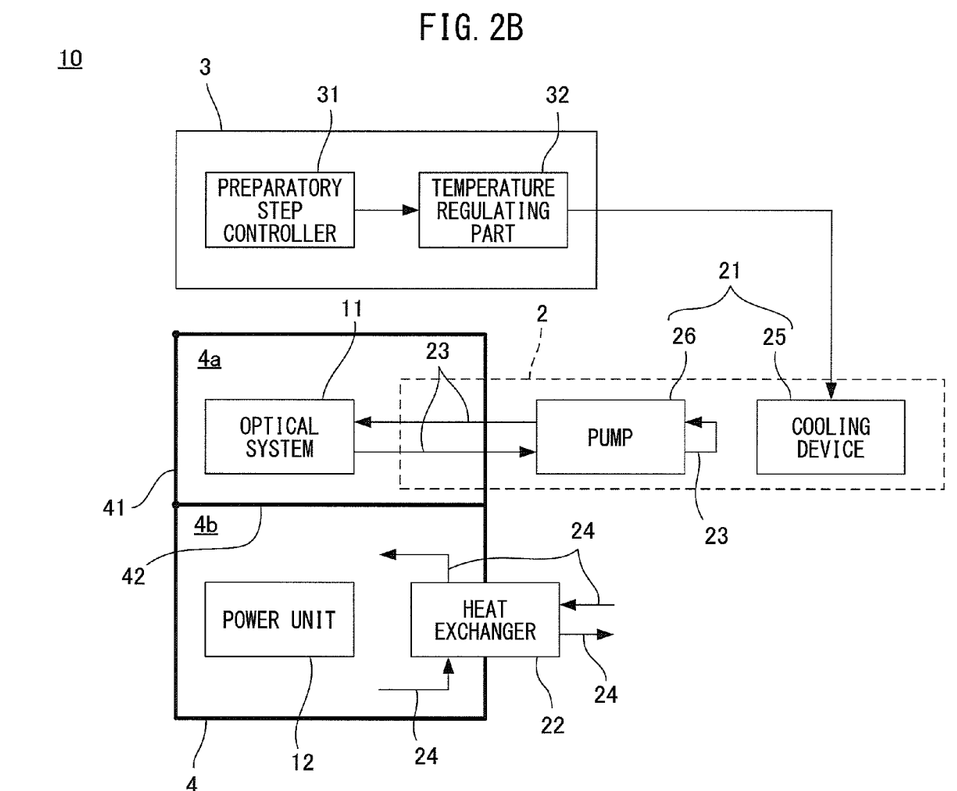
FIG. 2B is a view showing the state when switching to a service mode in the laser apparatus of FIG. 2A.

FIG. 2A and FIG. 2B shows an example of the configuration of the laser apparatus 10 according to the second embodiment. According to the present embodiment, the housing 4 does not include a valve 43, and the first space 4a and the second space 4b are partitioned from each other by a partition 42. The cooling water recirculation system 21 includes a cooling device 25 cooling the recirculated water and a pump 26 making the cooling water circulate (see FIG. 2A). The rest of the configuration of the laser apparatus 10 is similar to that of the first embodiment.

When the service mode is selected, the temperature regulating part 32 makes the cooling device 25 stop in response to a signal sent from the preparatory step controller 31. On the other hand, the pump 26 continues to circulate the cooling water (see FIG. 2B). The pump 26 generates heat when making the cooling water circulate. For this reason, after the cooling device 25 is stopped, due to the heat generated by the pump 26, the temperature of the cooling water and in turn the temperature of the optical system 11 gradually increase. A worker opens the door 41 of the housing 4 and performs the maintenance work at the time the temperature of the optical system 11 becomes sufficiently high. Due to this, in this embodiment as well, condensation at the optical system 11 can be prevented.

Figure 2C:
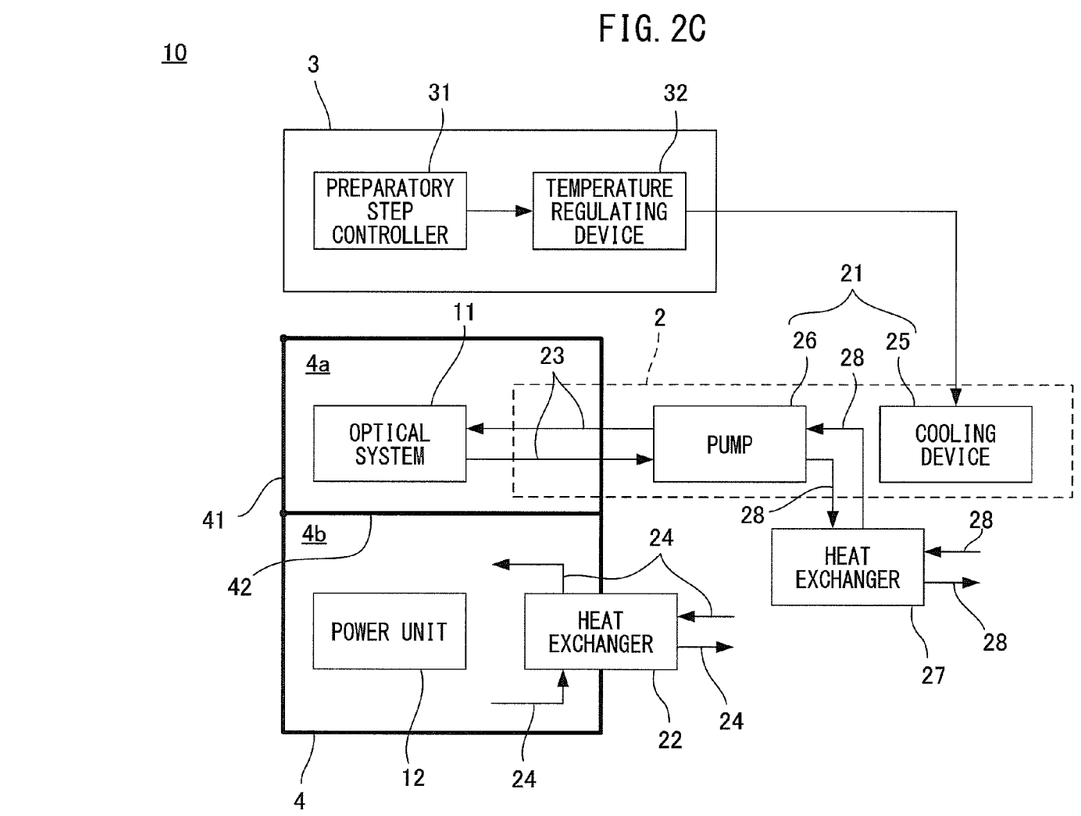
FIG. 2C is a view showing an example of the configuration of a laser apparatus according to a modification of the second embodiment.

FIG. 2C shows an example of the configuration of a laser apparatus 10 according to a modification of the second embodiment. In the present modification, the pump 26 may be configured so as to be connected to an additional heat exchanger 27 different from the heat exchanger 22 in the preparatory step. The heat exchanger 27, as shown by the arrows 28, is configured to exchange heat with the outside air. Therefore, the cooling water circulated by the pump 26 is warmed until reaching about the outside air temperature.

In other modifications of the first embodiment and the second embodiment, the cooling water recirculation system 21 may also house a heater used in the preparatory step. The heater is used for heating the cooling water supplied for cooling the optical system 11. Therefore, according to the present modification, the temperature of the optical system 11 is made to quickly rise. It is possible to complete the preparatory step in a short time and possible to perform the maintenance work of the laser apparatus 10 quickly. Alternatively, the optical system 11 is made to rise to a temperature higher than the outside air. Therefore, it is possible to prevent the formation of condensation even under an extremely high temperature and high humidity environment.

In still another modification, instead of the cooling water recirculation system 21, another known cooling means, for example, a cooling device utilizing a Peltier element, may be used. According to the first embodiment and second embodiment and their modifications, even without using a temperature sensor measuring the outside air temperature, it is possible to make the temperature around the optical system 11 approach the outside air temperature, so it is possible to provide a laser apparatus 10 having a simplified configuration.

Figure 3:
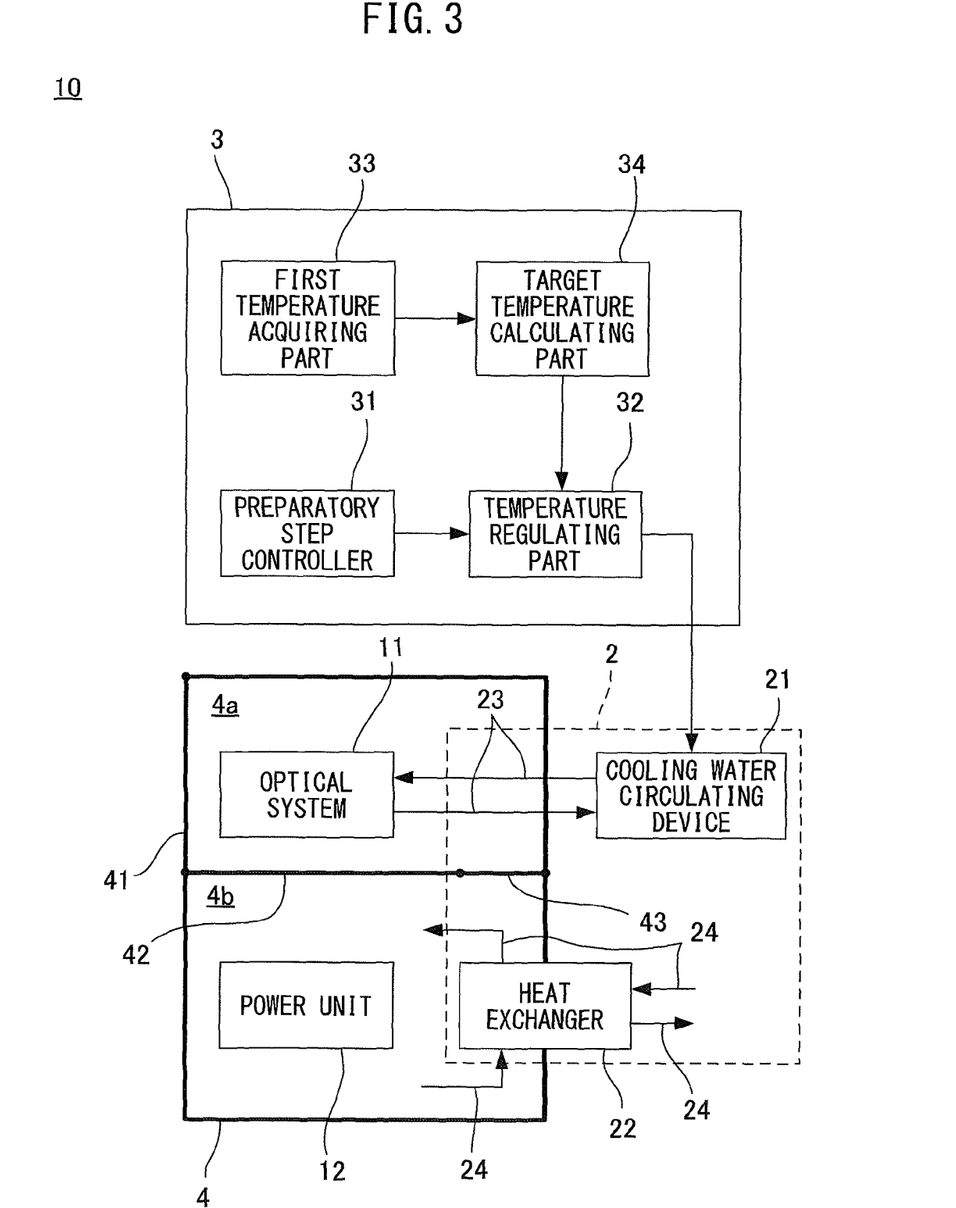
FIG. 3 is a view showing an example of the configuration of a laser apparatus according to a third embodiment.

FIG. 3 shows an example of the configuration of a laser apparatus 10 according to a third embodiment. According to the present embodiment, in the preparatory step, the target temperature of the optical system 11 is calculated according to the outside air temperature.

The controller 3 according to the present embodiment is further provided with a first temperature acquiring part 33 and a target temperature calculating part 34. The first temperature acquiring part 33 acquires an outside air temperature from a not shown temperature sensor. In one embodiment, the temperature sensor may be attached to the housing 4 or may be provided in the vicinity of the housing 4. Alternatively, the temperature sensor may also be attached to the cooling water recirculation system 21.

The target temperature calculating part 34 calculates the target temperature of the optical system 11 in accordance with the outside air temperature acquired by the first temperature acquiring part 33. In one embodiment, the target temperature calculating part 34 calculates the target temperature by adding a predetermined additional temperature to the outside air temperature. The temperature regulating part 32 controls the cooling water recirculation system 21 according to the calculated target temperature. Note that, the additional temperature is suitably set so that no location is formed where the temperature is locally low. In one embodiment, the additional temperature may be zero. Further, if the outside air temperature is lower than the temperature of the first space 4a during operation, the temperature during operation may be maintained as is at the target temperature.

According to the present embodiment, the temperature of the optical system 11 is adjusted according to the target temperature corresponding to the outside air temperature, so there is no need to warm the optical system 11 to a temperature higher than necessary and the maintenance work can be quickly performed.

Figure 4:
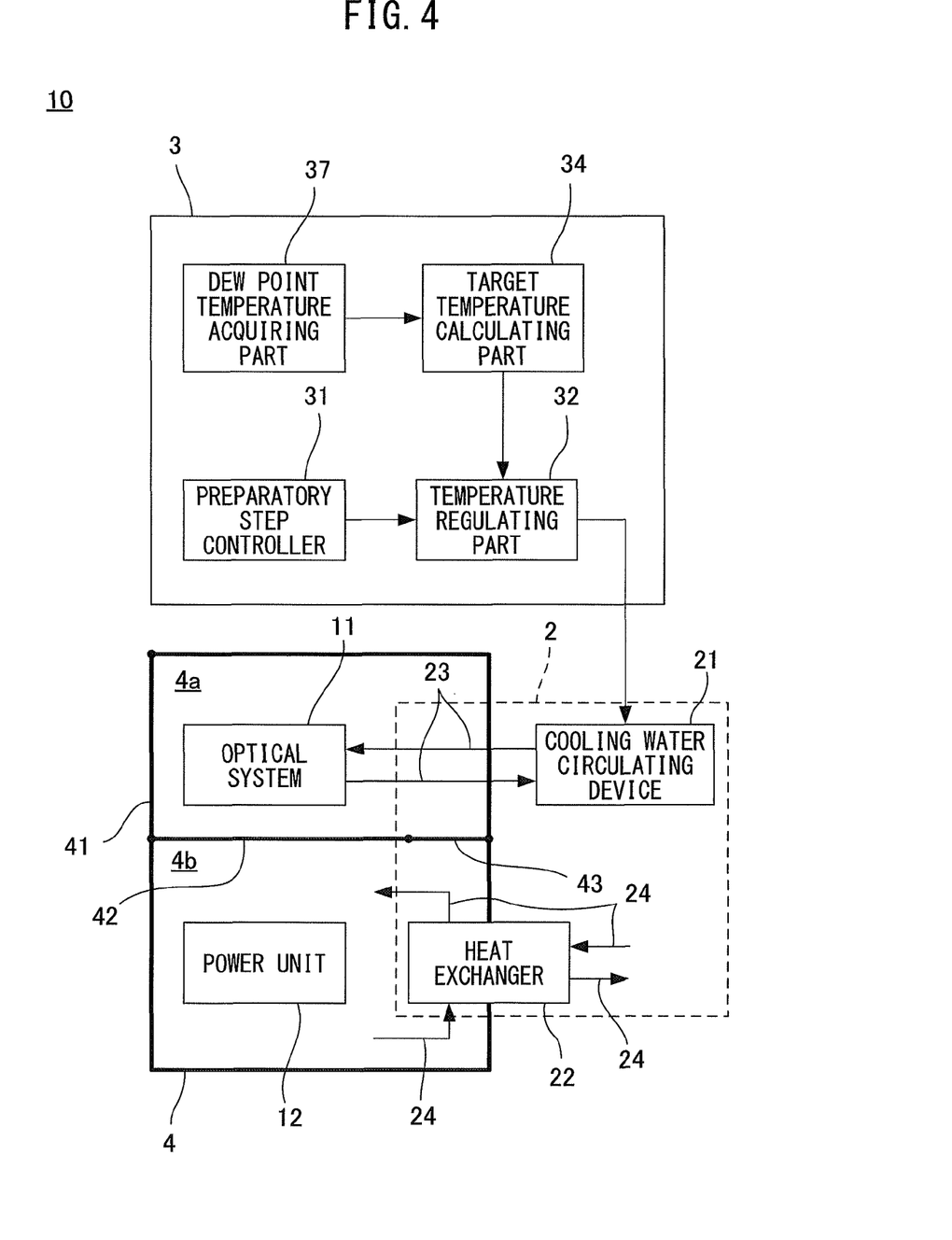
FIG. 4 is a view showing an example of the configuration of a laser apparatus according to a fourth embodiment.

FIG. 4 shows an example of the configuration of a laser apparatus 10 according to a fourth embodiment. According to the present embodiment, in the preparatory step, the target temperature of the optical system 11 is calculated in accordance with the dew point temperature of the outside air.

According to the present embodiment, instead of the first temperature acquiring part 33 explained referring to FIG. 3, the controller 3 includes a dew point temperature acquiring part 37. The dew point temperature acquiring part 37 calculates the dew point temperature of the outside air in accordance with the output air temperature measured by a temperature sensor and outside air humidity measured by a humidity sensor. Alternatively, the dew point temperature acquiring part 37 uses a dew point meter to directly acquire the dew point temperature of the outside air.

The target temperature calculating part 34 calculates the target temperature so that the target temperature becomes the dew point temperature of the outside air or a higher temperature. The target temperature calculating part 34 adds a predetermined additional temperature (for example about 5°

C.) to the dew point temperature acquired by the dew point temperature acquiring part 37 to calculate the target temperature.

According to the present embodiment, the temperature of the optical system 11 is adjusted so as to become a temperature higher than the dew point temperature. Therefore, even if there is a location where it is difficult for the temperature to locally rise, it is possible to reliably prevent the formation of condensation. Further, there is no longer a need for warming the optical system 11 to a temperature higher than necessary and the maintenance work can be performed quickly.

Figure 5:
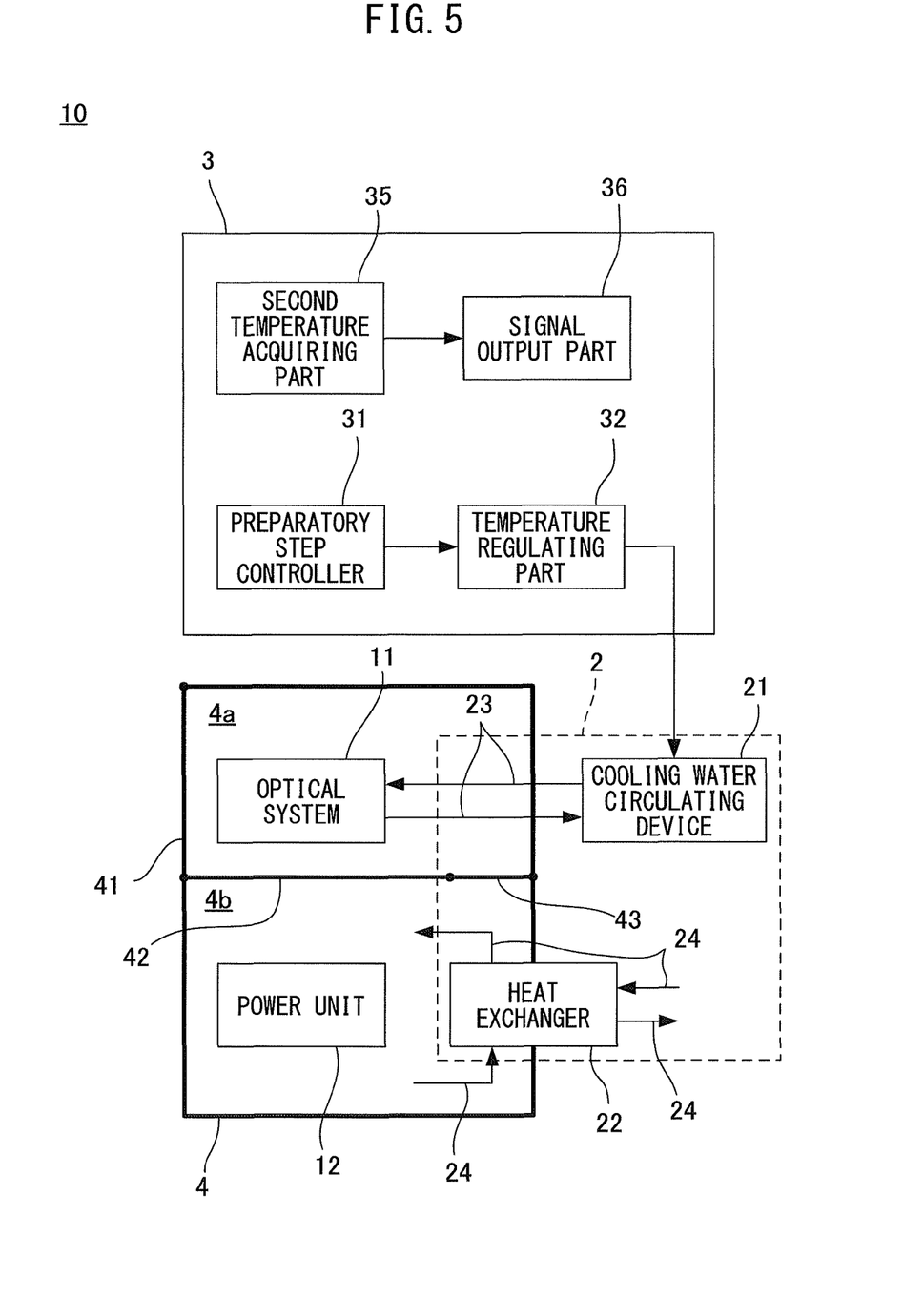
FIG. 5 is a view showing an example of the configuration of a laser apparatus according to a fifth embodiment.

FIG. 5 shows an example of the configuration of a laser apparatus 10 according to a fifth embodiment. In the present embodiment, the controller 3 includes a second temperature acquiring part 35 and a signal output part 36.

The second temperature acquiring part 35 uses a temperature sensor (not shown) provided inside the housing 4 to acquire the temperature of the optical system 11.

The signal output part 36 outputs a signal indicating that the preparatory step is completed when the temperature of the optical system 11 has reached a target temperature. The laser apparatus 10 is configured to inform the worker that maintenance work can be performed in response to the signal output from the signal output part 36. For example, the laser apparatus 10 is configured to notify the worker through a not shown display device or emit a sound effect in response to the signal sent out from the signal output part 36.

Figure 6:
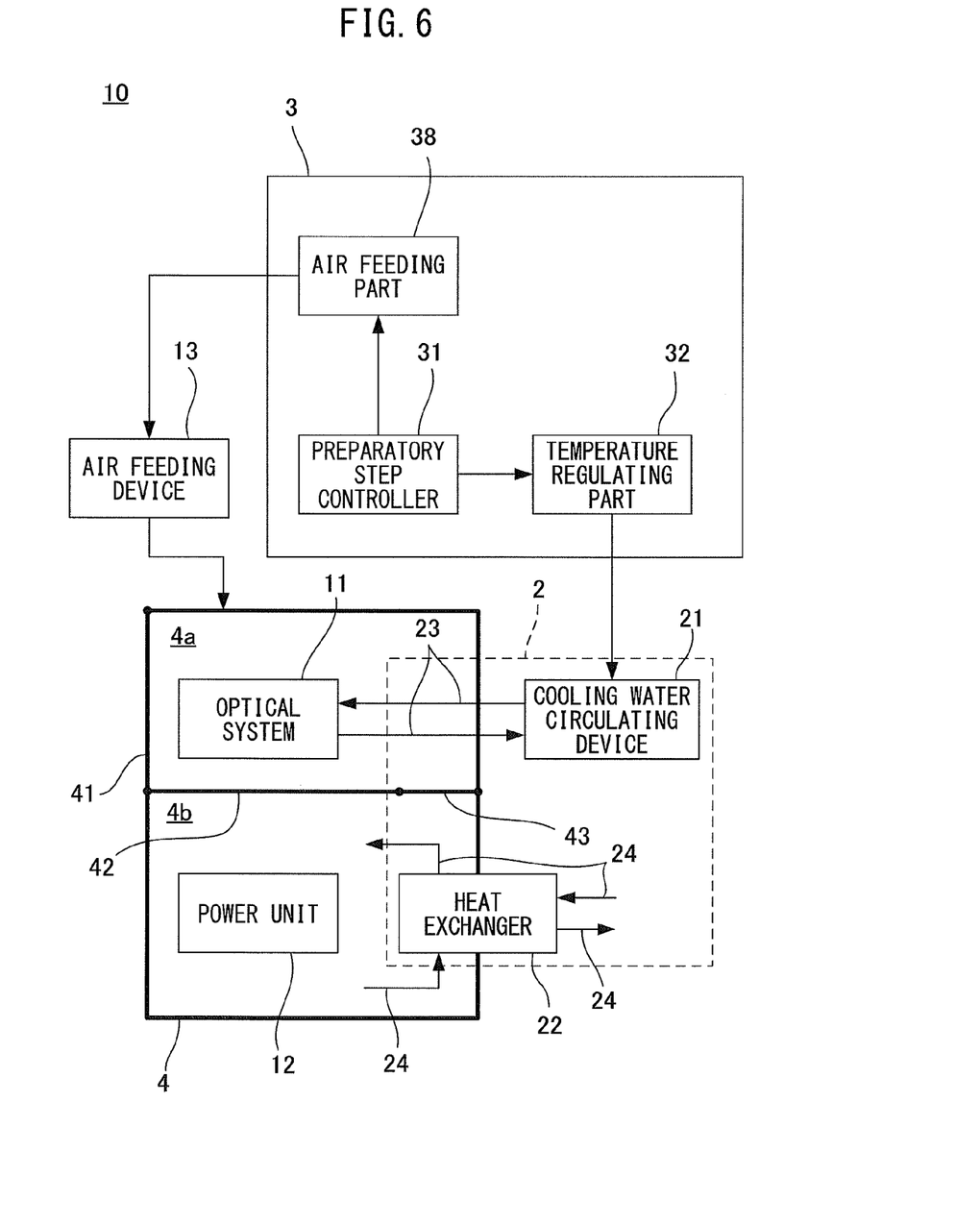
FIG. 6 is a view showing an example of the configuration of a laser apparatus according to a sixth embodiment.

FIG. 6 shows an example of the configuration of a laser apparatus 10 according to a sixth embodiment. According to the present embodiment, the laser apparatus 10 is provided with an air feeding device 13 feeding dry air into the housing 4. The controller 3 further includes an air feeding part 38.

According to the present embodiment, when the service mode is selected, the air feeding part 38 feeds dry air into the housing 4 by the air feeding device 13 in response to a signal sent out from the preparatory step controller 31. Due to this, even if the door 41 of the housing 4 is opened, the dry air continues to be fed, so the outside air does not flow into the first space 4a. Therefore, condensation can be prevented from forming.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art.

According to the laser apparatus according to the present invention, as the preparatory step before opening the housing, the temperature of the optical system is adjusted to a temperature of the temperature during operation or more. Alternatively, as the preparatory step before opening the door of the housing, dry air is fed to the inside of the housing. Due to this, it is possible to prevent the formation of condensation and quickly start maintenance work.

What is claimed is:

1. A laser apparatus comprising:
a housing having an openable sealed structure,
an optical system set inside the housing,
a temperature regulation mechanism maintaining the optical system at a predetermined temperature, and
a preparatory step controller configured to:
control the temperature regulation mechanism to maintain the optical system at a first temperature during operation of the laser apparatus, and
control the temperature regulation mechanism in a preparatory step to maintain the optical system at a second temperature greater than the first temperature in response to the controller determining that the laser apparatus is to be serviced.

2. The laser apparatus according to claim 1 further comprising
a first temperature acquiring part acquiring an outside air temperature and
a temperature calculating part using the outside air temperature as the basis to calculate the second temperature.

3. The laser apparatus according to claim 2, wherein the temperature calculating part is configured to calculate the second temperature so that the second temperature becomes the outside air temperature or more.

4. The laser apparatus according to claim 1, further comprising:
a dew point temperature acquiring part acquiring a dew point temperature of the outside air and
a temperature calculating part using the dew point temperature as the basis to calculate the second temperature.

5. The laser apparatus according to claim 1, further comprising a signal output part outputting a signal when a temperature of the optical system reaches the second temperature.

6. A laser apparatus comprising:
a housing having an openable sealed structure,
an optical system set inside the housing,
a temperature regulation mechanism maintaining the optical system at a predetermined temperature,
a preparatory step controller configured to:
control the temperature regulation mechanism to maintain the optical system at a first temperature during operation of the laser apparatus, and
control the temperature regulation mechanism in a preparatory step to maintain the optical system at a second temperature greater than the first temperature in response to the controller determining that the laser apparatus is to be serviced; and
an air feeding part feeding dry air to the inside of the housing when the preparatory step is started.

\* \* \* \* \*